VACUUM ACTUATED SWITCH AND HOLD-IN DEVICE

Filed April 2, 1964 3 Sheets-Sheet 1

INVENTOR.
WILLIS E. LIBBY
BY Douglas M. Clarkson
ATTORNEY

VACUUM ACTUATED SWITCH AND HOLD-IN DEVICE

Filed April 2, 1964 3 Sheets-Sheet 2

INVENTOR.
WILLIS E. LIBBY
BY Douglas M. Clarkson
ATTORNEY

VACUUM ACTUATED SWITCH AND HOLD-IN DEVICE

Filed April 2, 1964 3 Sheets-Sheet 3

INVENTOR.
WILLIS E. LIBBY
BY Douglas M. Clarkson
ATTORNEY

United States Patent Office 3,259,712
Patented July 5, 1966

3,259,712

VACUUM ACTUATED SWITCH AND HOLD-IN DEVICE

Willis E. Libby, Huntington, N.Y., assignor to Potter Instrument Company, Inc., Plainview, N.Y., a corporation of New York Filed Apr. 2, 1964, Ser. No. 356,796
5 Claims. (Cl. 200—82)

This invention, generally, relates to actuating and holding devices adapted to operate when pieces of equipment with which the devices are used exhibit certain operating characteristics, and more particularly, it concerns a switch hold-in mechanism of the type adapted for use with magnetic storage equipment to prevent accidental erasure and/or rewriting of a storage device on which valuable information has been recorded previously.

In information storage devices which use magnetic tapes, a serious problem is often presented during read-out operations due to a possible accidental enabling of "write" circuits with corresponding erasure and loss of valuable information that may be stored on the tape. To overcome this problem, write lockout switches have been employed in the past on magnetic tape transports and incorporated in such a manner that the write circuit is disabled at all times during operation of the transport to read out a tape on which information has been previously recorded.

To energize the switch and thus disable a write circuit, it has been the practice to mount a ring known as a "write lockout ring" on the back of tape reels carrying tapes on which information has been recorded so that when such a tape reel is placed on the tape transport for read out, the ring mechanically engages the switch, holding it in a closed position to disable the write circuit so long as that reel is on the tape transport. The rings used for this purpose are usually made of polystyrene, nylon or some other similar plastic, and such a ring rotates with the tape reel so that unless some arrangement is afforded to prevent continuous contact between the switch actuator and the ring during operation of the tape transport, a substantial amount of the ring will be worn or rubbed off. The rub-off thus produced has, in the past, been deposited on the tape and created errors in both writing and reading.

One approach to the problem resulting from write lock-out ring wear or rub-off has been to employ a solenoid arranged to be energized at all times during read-out operations. The armature of the solenoid is positioned to be spaced slightly from a portion of the switch actuator so that when the actuator is diplaced slightly by the plastic back-up ring on the tape reel, the magnetic field of the solenoid picks up the actuator and draws it out of mechanical contact with the back-up ring.

The actuator will be retained in this withdrawn position so long as the tape transport is in operation and so long as the solenoid is energized. Although the use of a solenoid in this manner has been effective for the intended purpose, the practical aspects of the equipment, such as size of the solenoid and the like, have required great care in maintaining the tolerances required to permit the magnetic field of the solenoid to pick up the switch actuator at precisely the proper point in its travel.

In accordance with the present invention, a substantially improved switch hold-in is effected by using a source of vacuum, such as the vacuum pump usually found on tape transports to draw a tape into contact with a driving capstan, for example, as a means to hold in the switch and to hold the actuator of the switch away from the device initiating movement thereof. Hence, the switch actuator is associated with a piston and spring biased to an initial position wherein the piston is displaced from the mouth of an open ended cylinder connected to the source of vacuum.

When air is being drawn through the mouth of the cylinder by the vacuum source, as would be the case in a tape transport during operation to read out or to record information on a magnetic tape, it will have no effect on the switch actuator so long as the actuator pin and the piston remain in the initial position away from the mouth of the cylinder. However, when the actuator pin and piston assembly is moved to an intermediate position toward the mouth of the cylinder by a "write lock-out" ring, for example, mounted on the back of a tape reel, the piston closes the mouth of the cylinder sufficiently to cause it to be drawn into the cylinder under the effect of the vacuum.

The travel of the actuator and piston further into the cylinder not only actuates a write lock-out switch but also moves the actuator out of contact with the "write lock-out" ring, or other device causing the initial actuator movement. Moreover, the switch actuator will be held in the actuated position so long as the vacuum source remains operative.

Accordingly, it is an object of the present invention to provide an improved device for holding a switch actuator in a predetermined position out of contact with the means for effecting initial movement thereof in a manner such that the problems heretofore experienced are substantially and effectively overcome.

Another object of this invention is to provide an improved hold-in device for write lock-out switches of the type employed with magnetic tape transports to prevent accidental erasure and/or rewriting of tape and which is capable of being easily installed in existing tape transports to provide reliable and trouble-free operation.

A further object of this invention is to provide a switch hold-in device of the type referred-to which relies solely on the vacuum system of a tape transport for operation and requires no additional electric circuitry.

A further object of the present invention is to provide a switch hold-in device of the type referred-to by which the requirements for accurate tolerances are minimized without compromise of positive hold-in capabilities.

Other objects and further scope of applicability of the present invention will become apparent from the detailed description to follow taken in conjunction with the accompanying drawings in which like reference numerals designate like parts and wherein.

Figure 1:
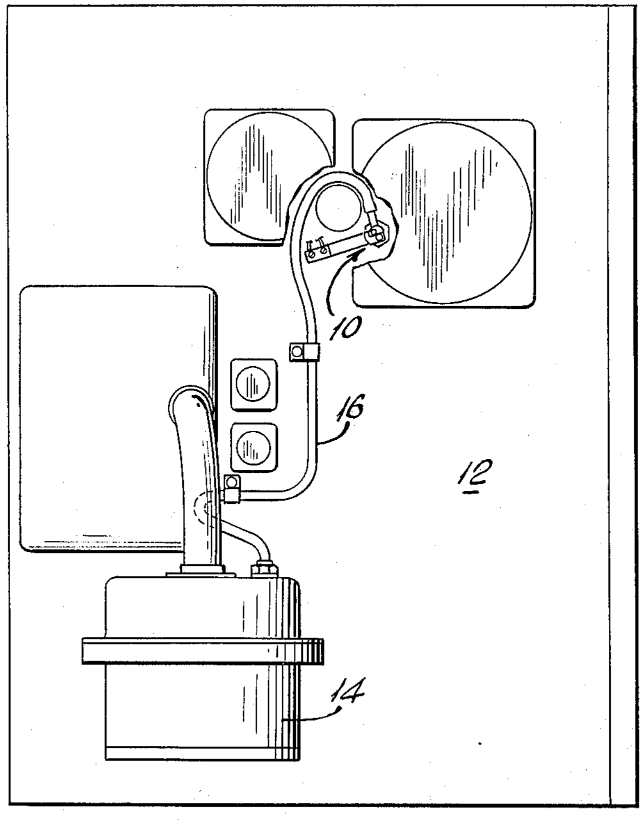
FIG. 1 is a schematic rear view in elevation of a tape transport panel with which the apparatus in accordance with the present invention is particularly adapted for use.
Figure 2:
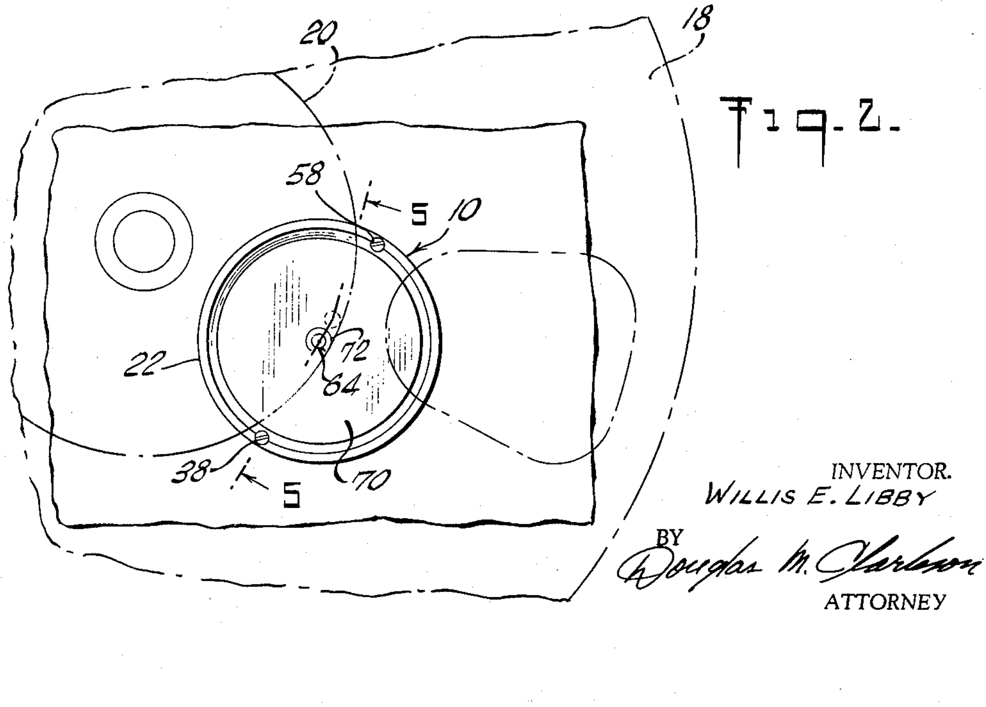
FIG. 2 is an enlarged front panel view of the switch actuator of the present invention with a fragmentary view of a tape reel superimposed thereon in phantom lines.
Figures 3, 4:
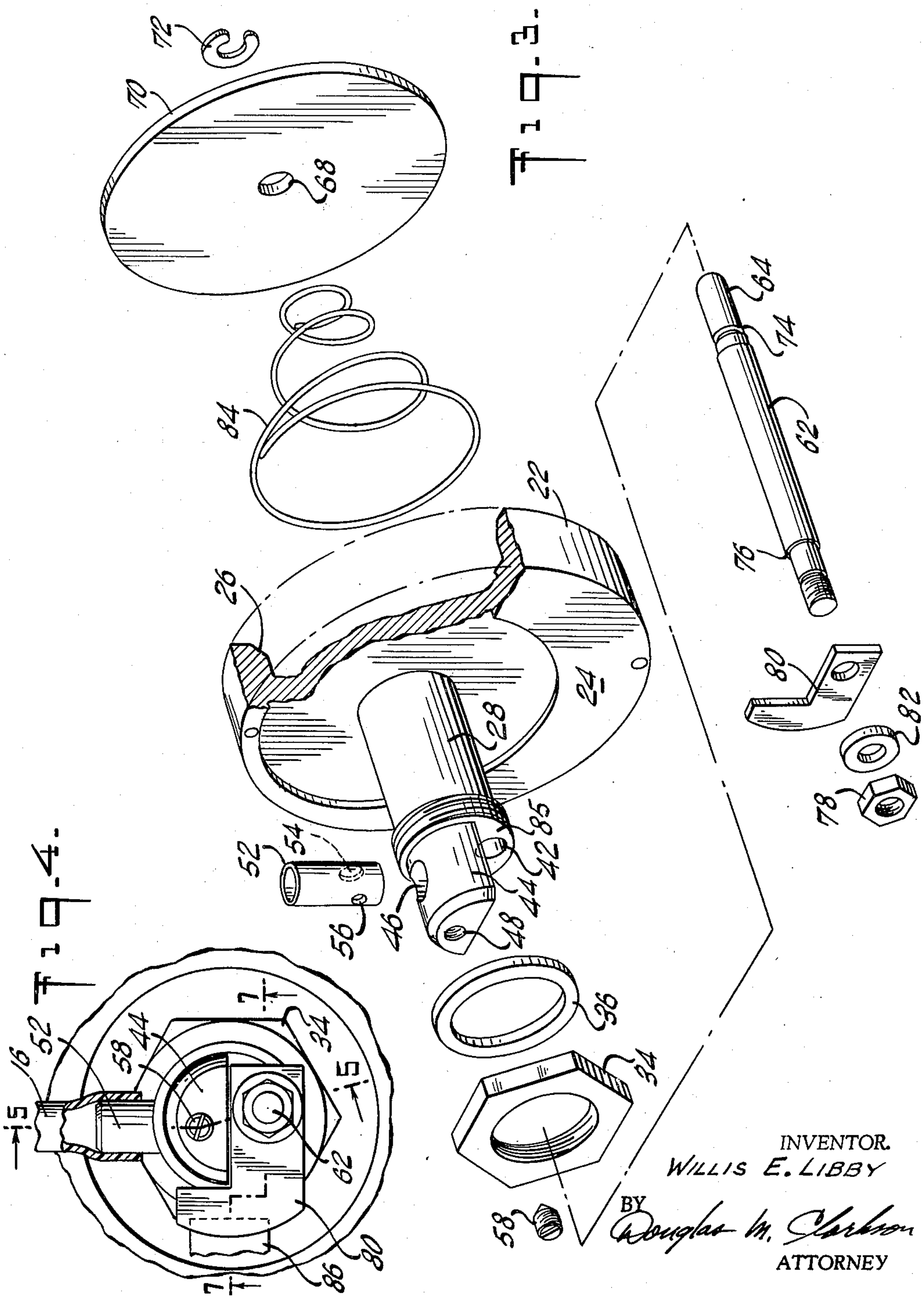
FIG. 3 is an exploded view of one form of the switch hold-in device of the present invention.
FIG. 4 is an enlarged fragmentary rear end view of the switch hold-in device in accordance with one form of the present invention illustrating the end which is opposite from the end visible in FIG. 2.

As shown in the drawings, and particularly FIGS. 1 and 2 thereof, a preferred form of the switch actuating and hold-in device in accordance with this invention is designated generally by the reference numeral 10 and is shown incorporated in a conventional tape transport panel 12 having a vacuum pump 14. The vacuum pump 14 is connected to the hold-in device 10 by way of a hose 16 and in a manner that will be more fully described hereinafter.

Although many of the details of the tape transport 12 have been omitted for clarity, it will suffice for a complete understanding of the present invention to note that the magnetic tape used with the transport is carried on a reel 18, shown in phantom lines in FIG. 2, and the reel 18 is arranged to have a plastic "write lock-out" ring or disc 20 detachably mounted on the back side of the reel 18 facing the device 10. As referred to above and in accordance with conventional practice, the ring 20 is mounted on the reel 18 when the tape supported on the reel has recorded information which it is wished to safeguard. Thus, when it is desired to write additional information on such a tape or even to erase the information already on the tape, the ring 20 must first be removed from the reel 18.

A more complete understanding of the structural details of the actuating and hold-in device 10 may be had by reference to FIGS. 3–8 of the drawings. Hence, the hold-in device 10 is shown to include a cylinder 22 having a wall 24 on one end and an outwardly flared mouth 26 on the other end. Although in the embodiment shown, the cylinder 22 is circular, it is contemplated that other shapes could be used. Accordingly the word "cylinder" as used herein and in the appended claims is intended to encompass means providing a surface defined by a straight line moving parallel to a fixed straight line.

A circular mounting boss 28 is formed integrally with the wall 24 and is adapted to project rearwardly through an opening 30 in a panel 32 forming part of the interior of the tape transport 12. The mounting boss 28 is externally threaded near its terminal or rear end to receive a nut 34 to enable a firm clamping of the cylinder 22 onto the panel 32 of the tape transport. Sealing gaskets 36 may be provided in the mounting asembly and also, additional screws 38 may be provided as a further means of mounting the cylinder 22 on the panel 32.

Figure 5:
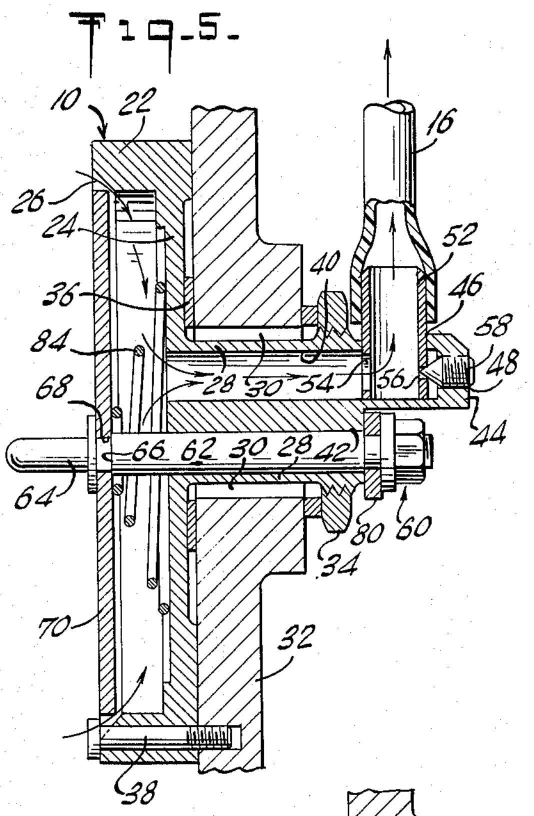
FIG. 5 is an enlarged view in cross-section taken along the line 5—5 shown in FIG. 2 and in FIG. 4 showing the device in a non-actuating condition.
Figure 6:
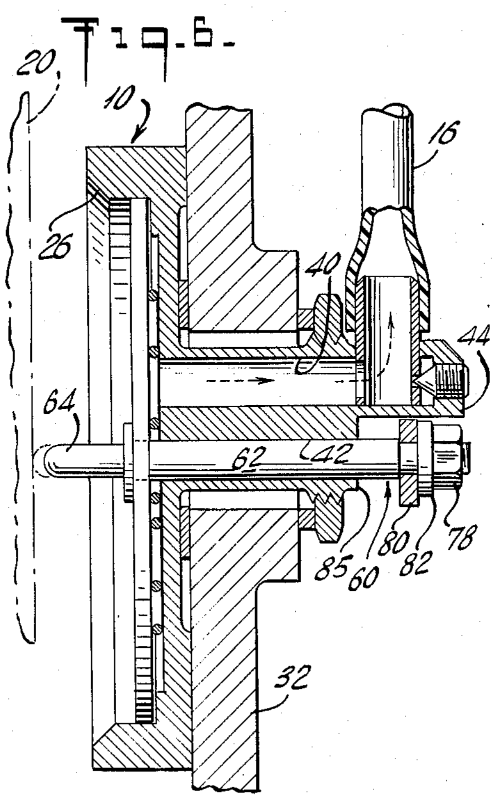
FIG. 6 is an enlarged view in cross-section similar to FIG. 5 but illustrating the component parts of the hold-in device of FIG. 5 in an actuating position.

As shown in FIGS. 5 and 6, the mounting boss 28 has a pair of longitudinally extending, generally parallel bores 40 and 42 drilled therein. The bore 40 opens at one end into the cylinder 22. The other end of the bore 40 terminates within a semicylindrical projection 44 at the rear end of the boss 28, and the projection, in turn, is provided with a radial bore 46 and an internally threaded end bore 48.

A tubular insert 52 is received within the radial bore 46 and is provided with relatively large and small apertures 54 and 56, respectively, on the end thereof received within the bore 46. The tubular insert 52 receives one end of the hose 16 thereby effecting a fluid passage from the cylinder 22 to the vacuum pump 14 by way of the bore 40, the aperture 54, the insert 52 and through the hose 16. The insert 52 is retained in the position shown in FIGS. 5 and 6 by an externally threaded plug 58 received in the end bore 48 having a pointed end received in the relatively small aperture 56.

The bore 42 in the mounting boss 28 is disposed concentrically with respect to the axis of the cylinder 22 for receiving an actuator pin assembly, generally designated by the reference numeral 60. The assembly 60 includes an actuator pin 62 having a rounded front end 64 of reduced diameter to define a shoulder 66.

The front end 64 of the pin is received within a central aperture 68 of a disc-like piston 70 which is retained in position against the shoulder 66 by a spring clip 72 received within a groove 74 about the front end 64. The rear end of the pin 62 is also of reduced diameter to provide a shoulder 76 and is externally threaded to receive a nut 78.

A switch engaging plate 80 of any convenient configuration is received over the rear end of the pin 62 and is secured in place against the shoulder 76 by the nut 78 and a washer 82. A compression spring 84, which is abutting at one end against the piston 70 and at the other end against the wall 24 of the cylinder 22, is disposed about the pin 62 to bias it outwardly until the switch engaging plate 80 engages a semi-circular rear face 85, FIG. 6, of the boss 28 under the projection 44.

Figure 7:
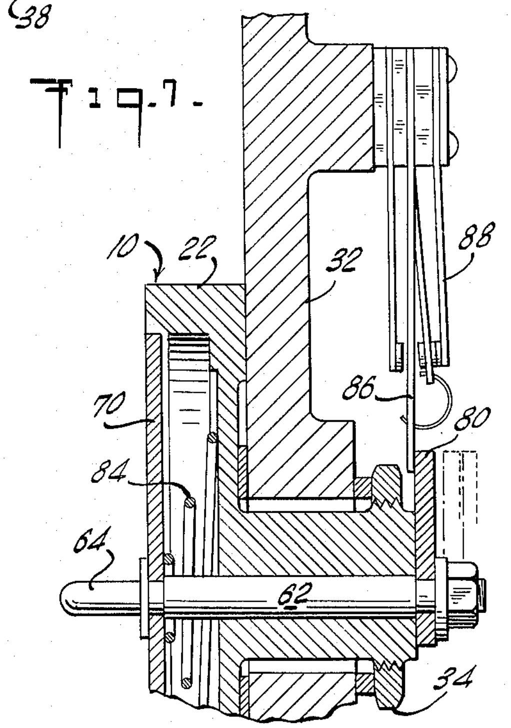
FIG. 7 is an enlarged fragmentary view in cross-section taken along the line 7—7 in FIG. 4.
Figure 8:
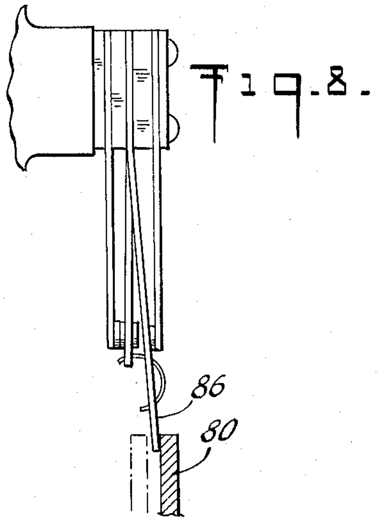
FIG. 8 is an enlarged fragmentary view in cross-section illustrating the switch shown in FIG. 7 in a different operative position.

As shown in FIGS. 7 and 8, the plate 80 is positioned to contact an actuator leaf 86 of a suitable two-position switch 88. The switch 88 is adapted to be connected electrically to the write circuit (not shown) of the tape transport 12 in such a manner that the write circuit is operative when the switch is positioned as shown in FIG. 7 and is disabled when the switch is positioned as shown in FIG. 8. When the switch is in the last-mentioned position to disable the write circuit, usually it is preferable to have a visual indicator illuminated on the front panel of the tape transport.

The manner in which the invention may be employed as a "write lock-out" switch hold-in device in the tape transport 12 will now be explained.

In this arrangement, it will be appreciated that when the tape transport is rendered operative or is turned on, the vacuum pump 14 will be energized to draw air through the hose 16 and thus open mouth 26 of the cylinder 22. Moreover, if the tape reel 18 has not yet been positioned on the tape transport 12, or if the particular tape reel employed does not have the lock-out ring 20 mounted thereon, the pin 62 will assume the initial position shown in FIG. 5, i.e., biased forwardly from the panel by the spring 84 to a position where the plate 80 abuts the surface 85 on the end of the mounting boss 28.

As shown in FIG. 5, the piston 70 is positioned on the pin 62 in such an manner that when the pin 62 is in this initial position, a gap is afforded between the periphery of the piston 70 and the outwardly flared mouth 26 of the cylinder 22. Thus, the vacuum pump will continue to pump air through the cyinder 22 in the manner aforementioned, and the switch 88 will be retained in the position shown in FIG. 7 to "enable," or render operative, the write circuit in the tape transport 12.

It will be appreciated, therefore, that a magnetic tape supported on a reel without the ring 20 may be read out, recorded or erased depending on the manner in which the tape transport is operated without any restriction, due to the pin 62 and switch 88 remaining in the respective positions illustrated in FIGS. 5 and 7 of the drawings.

When, however, the ring 20 is mounted on the reel 18 which is positioned properly on the tape transport 12, the forward end 64 of the pin will be contacted and moved slightly rearwardly by the disc to an intermediate position where the gap between the periphery of the piston 70 and the mouth 26 of the cylinder is substantially closed. Thereafter, the vacuum will draw the piston 70 into the cylinder 22 and will retract the pin 62 to a position which is spaced back from the ring 20, as shown in FIG. 6. Correspondingly, the plate 80 carried by the pin 62 will engage the actuating leaf 86 of the switch 88 to move the switch into a position to disable or lock out the "write," or recording, head of the tape transport.

Thus, there will be no possibility of the "write," or recording head, erasing valuable information stored on the tape during a read-out cycle. Moreover, it will be noted that the manner in which the piston 70 is drawn into the cylinder 22 completely and effectively draws the end 64 out of contact with the ring 20 so, as it rotates with the reel 18, no wear due to contact with the pin is experienced.

It will be apparent, therefore, that by this invention an extremely effective and yet relatively simple switch hold-in device is provided by which the objects mentioned above are completely fulfilled. While the switch hold-in device of this invention is particularly suitable for use in combination with a magnetic tape transport in the manner described herein, it will be apparent that the invention may assume different specific forms and may be employed in environments apart from the magnetic storage equipment described.

Accordingly, it is to be distinctly understood that the foregoing description is illustrative of a preferred embodiment only, not limiting, and that the true spirit and scope of the present invention is to be determined by reference to the appending claims.

What is claimed is:

1. Switch actuating and hold-in apparatus for use with magnetic tape reels adapted to have write lockout means mounted thereon during read-out in a tape transport having a vacuum pump, said apparatus comprising,
 cylinder means having an open mouth,
 means for mounting said cylinder means in the tape transport so that said open mouth faces the write lockout ring of a tape reel operatively positioned in the tape transport, said mounting means being positioned at the end of said cylinder means opposite from said mouth,
 pin means carried slidably by said mounting means and having a forward end projecting out of said cylinder means through said open mouth, the forward end of said pin means being engageable and movable by the tape mounted write lockout ring from an initial position to an intermediate position,
 piston means fixedly mounted on said pin means to be spaced forwardly of said open mouth when said pin means is in said initial position,
 switch operating means fixed on the rear end of said pin means, and
 means for effecting fluid communication through said cylinder means and said mounting means to a vacuum pump of the tape transport whereby said pin means and said piston is drawn into said cylinder away from the write lockout ring to a final position by said vacuum pump.

2. The apparatus recited in claim 1 including,
 a compression spring about said pin means and extending between said piston and the nearest end of said mounting means to said piston to bias said pin means toward said initial position, and
 said switch operating means being engageable with the rear end of said mounting means to establish said initial position.

3. The apparatus recited in claim 2 in which
 said mounting means is a boss projecting from the farthest end of said cylinder means from said piston, and
 wherein said fluid communication means includes a bore in said boss opening into said cylinder means.

4. Magnetic storage apparatus for use with a magnetic tape reel adapted to have a write lockout ring mounted thereon during read-out operations, said apparatus comprising in combination,
 a tape transport including means for receiving the magnetic tape reel,
 a vacuum pump on said tape transport,
 a write lockout switch also on said tape transport, and
 means on said tape transport connected with said vacuum pump and including means for engaging said write lockout ring on the tape reel for actuating said switch to an operative position.

5. Magnetic storage apparatus for use with a magnetic tape reel adapted to have a write lockout ring mounted thereon during read-out operations, said apparatus comprising in combination,
 a tape transport for receiving the magnetic tape reel,
 a vacuum pump on said tape transport,
 a write lockout switch also on said tape transport,
 means defining a cylinder fixedly positioned on said tape transport, said cylinder having an open mouth facing in the direction of the write lockout ring of the magnetic tape received in the tape transport,
 a switch actuating pin connected with said switch and movably positioned on the axis of said cylinder for axial movement from an initial position to an intermediate position by the write lockout ring,
 piston means fixed to said pin at a position to be spaced axially from said cylinder mouth when said pin is in said initial position and received within said mouth in fluid-tight relationship thereto when said pin is in said intermediate position, and
 means connecting said vacuum pump to said cylinder whereby said piston and said pin are moved from said intermediate position to a final position with said pin out of contact with the write lockout ring to energize and hold in said switch.

References Cited by the Examiner

UNITED STATES PATENTS

| | | | |
|---|---|---|---|
| 2,182,816 | 12/1939 | Moffett | 200—82 |
| 2,286,921 | 5/1942 | Morris | 200—82 X |
| 2,853,574 | 9/1958 | Quirk | 200—81 |

BERNARD A. GILHEANY, *Primary Examiner.*

ROBERT K. SCHAEFER, *Examiner.*

H. M. FLECK, *Assistant Examiner.*